United States Patent
Iyer

(10) Patent No.: US 8,516,190 B1
(45) Date of Patent: *Aug. 20, 2013

(54) REPORTING LOGICAL SECTOR ALIGNMENT FOR ATA MASS STORAGE DEVICES

(75) Inventor: Rakesh Narayan Iyer, San Jose, CA (US)

(73) Assignee: NVIDIA Corporation, Santa Clara, CA (US)

( * ) Notice: Subject to any disclaimer, the term of this patent is extended or adjusted under 35 U.S.C. 154(b) by 740 days.

This patent is subject to a terminal disclaimer.

(21) Appl. No.: 12/239,112

(22) Filed: Sep. 26, 2008

(51) Int. Cl.
*G06F 12/00* (2006.01)

(52) U.S. Cl.
USPC .......................................... 711/114; 711/112

(58) Field of Classification Search
None
See application file for complete search history.

(56) References Cited

U.S. PATENT DOCUMENTS

| | | | |
|---|---|---|---|
| 6,839,827 B1 * | 1/2005 | Beardsley et al. | 711/206 |
| 7,085,861 B2 * | 8/2006 | Chiang et al. | 710/38 |
| 7,535,666 B2 * | 5/2009 | Hiratsuka et al. | 360/73.03 |
| 7,694,173 B1 | 4/2010 | Schoenthal et al. | |
| 7,716,448 B2 * | 5/2010 | Schneider | 711/170 |
| 2002/0065982 A1 | 5/2002 | Colligan | |
| 2004/0088479 A1 | 5/2004 | Hall | |
| 2005/0114595 A1 * | 5/2005 | Karr et al. | 711/114 |
| 2008/0005467 A1 | 1/2008 | Morley et al. | |
| 2009/0168230 A1 | 7/2009 | Hwang et al. | |
| 2011/0022793 A1 | 1/2011 | Gaspard | |

OTHER PUBLICATIONS

Information technology- AT Attachment 8—ATA/ATAPI Command Set (ATA8-ACS), Working Draft Project American National Standard. May 21, 2007. p. 41-42,405-406 and 417-422.

* cited by examiner

*Primary Examiner* — Sanjiv Shah
*Assistant Examiner* — Daniel Tsui
(74) *Attorney, Agent, or Firm* — Patterson & Sheridan, L.L.P.

(57) ABSTRACT

Systems and methods for using RAID with ATA mass storage devices can benefit from operating system optimizations for avoiding unaligned write accesses. When the ATA mass storage devices in the RAID array have different physical sector sizes, the largest physical sector size is reported as the physical sector size for the single disk represented by the RAID array. The operating system can optimize accesses that are aligned with all of the physical sector sizes within the RAID array. Additionally, any storage devices that have a first logical sector that does not have an offset of zero, are configured to ignore all logical sectors in the first physical sector. Accesses to the first logical sector are mapped to the second physical sector. A logical sector alignment of zero is then reported to the operating system for the RAID array, enabling the operating system to avoid unaligned writes.

14 Claims, 6 Drawing Sheets

REPORTING LOGICAL SECTOR ALIGNMENT FOR ATA MASS STORAGE DEVICES

BACKGROUND OF THE INVENTION

1. Field of the Invention

One or more aspects of the invention generally relate to using large sector size serial ATA (SATA) mass storage devices in a redundant array of independent disks (RAID) array, and more particularly to configuring sector alignment and physical sector size information for the RAID array.

2. Description of the Related Art

A RAID array includes two or more storage devices and appears as a single storage device to an operating system. As the storage capacity of disk drives has increased, the physical sector size has also increased. The physical sector is the smallest unit of data in an ATA storage device. The logical sector is the smallest host addressable unit of data in an ATA storage device. It is desirable to have a larger physical sector size in order to improve the efficiency of error detection and correction for the ATA storage device. It is also desirable to support older disk drives with smaller physical sector sizes along with newer disk drives in a single RAID array.

Recently, optimizations implemented at the operating system level use storage system characteristics to improve access performance by avoiding unaligned writes. In particular, the physical sector size characteristic is used by contemporary operating systems to ensure that writes are aligned to physical sector boundaries. The operating system is configured to use a single physical sector size value to perform optimizations. When a RAID includes storage devices with varying physical sector sizes, it is not possible to report the differing storage system characteristics to the operating system. It is desirable to allow a RAID array that includes storage devices with varying physical sector sizes to benefit from the optimizations performed at the operating system level.

In addition to having different physical sector sizes, different ATA storage devices within a RAID array may also have varying logical sector alignments. Like the physical sector size, the logical sector alignment characteristic is used by contemporary operating systems to ensure that writes are aligned. The operating system is configured to use a single logical sector alignment value to perform optimizations. It is desirable to allow a RAID array that includes storage devices with varying logical sector alignments to benefit from the optimizations performed at the operating system level.

SUMMARY OF THE INVENTION

The current invention involves new systems and methods for using RAID with storage devices having varying physical sector sizes and logical sector alignments to benefit from the optimizations performed at the operating system level. Any ATA mass storage devices that have a first logical sector that does not have an offset of zero, are configured to ignore all logical sectors in the first physical sector. Accesses to the first logical sector are mapped to the second physical sector. A sector alignment of zero is then reported to the operating system for the RAID array, allowing the operating system to optimize accesses to avoid unaligned writes. Additionally, when the ATA mass storage devices in the RAID array have different physical sector sizes, the largest physical sector size is reported as the physical sector size for the single disk represented by the RAID array. The operating system can then optimize accesses to be aligned with physical sector boundaries within the RAID array.

Various embodiment of a method of the invention for reporting logical sector alignment for an ATA mass storage device include configuring metadata stored in the first ATA mass storage device to store an offset equal to a number of logical sectors in a physical sector of the first ATA mass storage device, wherein the offset is applied to all accesses of the first ATA mass storage device. A value of zero is reported as the logical sector alignment to an operating system for the first ATA mass storage device.

Various embodiments of the invention include a system for reporting a logical sector alignment include a first ATA mass storage device configured to store data, a central processing unit configured to execute an operating system, and a device driver. The device driver is configured to configure metadata stored in the first ATA mass storage device to use an offset equal to a number of logical sectors in a physical sector of the first ATA mass storage device, wherein the offset is applied to all accesses of the first ATA mass storage device and report a value of zero as the logical sector alignment to the operating system for the first ATA mass storage device.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
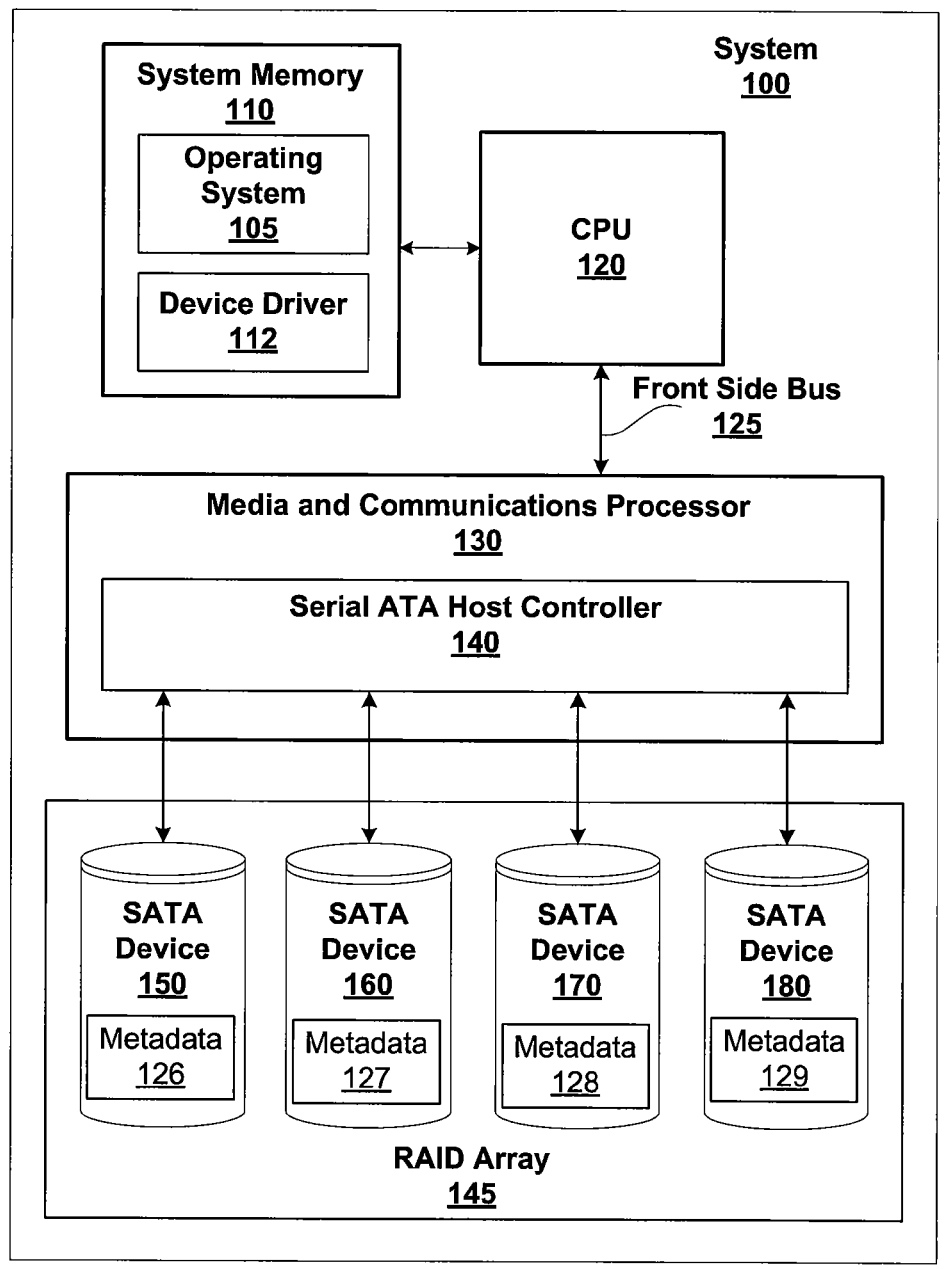
FIG. 1 is a block diagram of an exemplary embodiment of a respective computer system including a CPU and SATA devices configured in a RAID array, in accordance with one or more aspects of the present invention.

FIG. 1 is a block diagram of an exemplary embodiment of a respective computer system, system 100, in accordance with one or more aspects of the present invention. System 100 includes a CPU 120, media and communications processor 130, and SATA mass storage devices 150, 160, 170, and 180 that conform to the SATA standard and are configured in a RAID array 145. In some embodiments of the present invention, SATA devices 150, 160, 170, and 180 are mass storage devices, such as hard disk drives that are optical or solid state based. System 100 includes a system memory 110 for storing programs and data used by CPU 120, including data that may be read from or written to SATA devices 150, 160, 170, and 180.

System 100 may be a desktop computer, server, laptop computer, palm-sized computer, tablet computer, game console, portable wireless terminal such as a personal digital assistant (PDA) or cellular telephone, computer based simulator, or the like. CPU 120 may include a system memory controller to interface directly to system memory 110. In alternate embodiments of the present invention, CPU 120 may communicate with system memory 110 through a system interface, e.g., I/O (input/output) interface or a bridge device.

A device driver 112 is stored in system memory 110. Device driver 112 may be provided by the system designer and/or manufacturer of system 100 and is configured to interface between an operating system 105 running on CPU 120 and a media and communications processor 130. Media and communications processor 130 is coupled between CPU 120 and RAID array 145. Media and communications processor 130 is coupled to CPU 120 by a high bandwidth front side bus 125. In some embodiments of the present invention, media and communications processor 130 interfaces with CPU 120 over front side bus 125 using a peripheral component interface (PCI) HyperTransport™ Protocol.

Media and communications processor 130 facilitates data transfers between system memory 110 and one or more hard disk drives and includes a serial ATA host controller 140 that is coupled to one or more SATA devices 150, 160, 170, and 180. SATA devices 150, 160, 170, and 180 each include drive electronics that control storing and reading of data within the individual storage media and report device specific characteristics, e.g., physical sector sizes and logical sector alignments, to device driver 112. Metadata 126, 127, 128, and 129 within each of the SATA devices may be configured by device driver 112, as needed to benefit from optimizations performed by operating system 105.

In other embodiments of the present invention, media and communications processor 130 may include additional ports such as universal serial bus (USB), accelerated graphics port (AGP), and the like. Each SATA device 150, 160, 170, and 180 may be replaced or removed, so at any particular time, system 100 may include fewer or more SATA devices. RAID array 145 may include older disk drives with smaller physical sector sizes along with newer disk drives with larger physical sector sizes. SATA storage devices 150, 160, 170, and 180 may have varying logical sector alignments.

Logical Sector Alignment

Figure 2A:
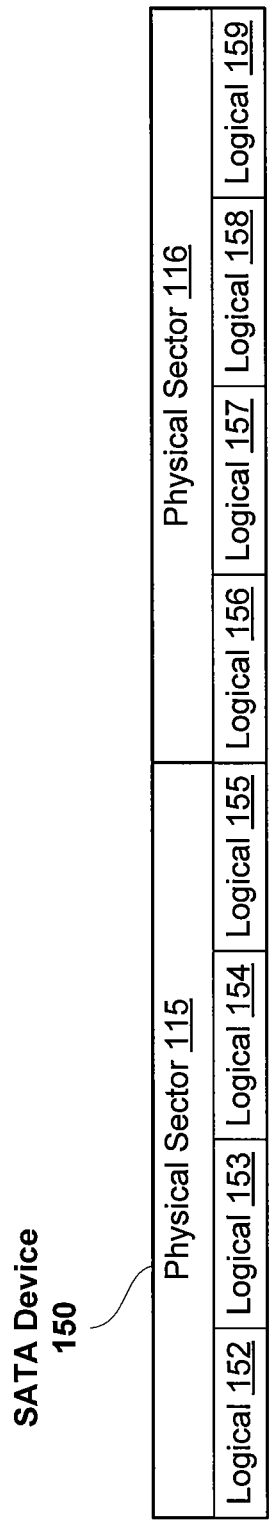
FIG. 2A is a conceptual diagram illustrating the relation between logical sector alignments and physical sectors within a storage device, in accordance with one or more aspects of the present invention.

FIG. 2A is a conceptual diagram illustrating the relationship between logical sector alignments and physical sectors within a storage device, e.g., SATA devices 150, 160, 170, and 180, in accordance with one or more aspects of the present invention. SATA device 150 includes multiple physical sectors, of which physical sector 115 and physical sector 116 are shown in FIG. 2A. Each physical sector includes a number of logical sectors which are the smallest host addressable unit of data within a SATA device. As shown in FIG. 2A, physical sectors 115 and 116 each include four logical sectors, e.g., logical 152, 153, 154, 155, 156, 157, 158, and 159. Legacy software designed for use with older disk drives typically uses a 512 byte logical sector size. As the physical sector size of storage devices has increased, the physical sector sizes are implemented as "power of two" multiples of the logical sector size. For example, when the size of logical (sectors) 152, 153, 154, 155, 156, 157, 158, and 159 is 512 bytes, the size of physical sectors 115 and 116 may be 1024 bytes, 2048 bytes, 4096 bytes, and the like.

Since read and write accesses can be aligned to a logical sector, the accesses are not constrained to align on physical sector boundaries. Contemporary operating systems ensure that accesses are aligned to physical sector boundaries in order to improve storage bandwidth performance. Unaligned writes require reading and buffering of aligned data, insertion of the unaligned write data, and then writing of the combined data that is aligned. For example, an unaligned write of logical sectors 157, 158, and 159 requires reading physical sector 116, insertion of the write data into logical sectors 157, 158, and 159, and writing of physical sector 116. In addition to aligning the read and write accesses based on a physical sector alignment reported by the storage device, an operating system may also use the logical sector alignment reported by a storage device.

The first physical sector of a storage device, such as physical sector 115 of SATA device 150 may store additional information that is not available to a user in one or more of logical (sectors) 152, 153, 154, and 155. The logical sector alignment is zero when logical (sector) 152 is the first logical sector available to store user data. The logical sector alignment is one when logical (sector) 153 is the first logical sector available to store user data. The logical sector alignment is two when logical (sector) 154 is the first logical sector available to store user data. The logical sector alignment is three when logical (sector) 155 is the first logical sector available to store user data.

The logical sector alignment may be used by operating system 105 to avoid reading and writing the logical sectors in an unaligned fashion. When the physical sector size is also reported, operating system 105 may avoid performing unaligned accesses, i.e, accesses that cross a physical sector boundary, to improve the access performance of SATA device 150.

In a conventional system that uses a single disk, reporting the single logical sector alignment and physical sector size for use by operating system 105 is straightforward. As previously explained, one or more of SATA devices 150, 160, 170, and 180 may have different logical sector alignments that may not be represented by a single logical sector alignment. Even if the SATA devices 150, 160, 170, 180 have the same nonzero logical sector alignment they may not be represented by a single logical sector alignment. Each of SATA devices 150, 160, 170, and 180 may be configured by device driver 112 to store persistent array metadata 125, 127, 128, and 129, respectively, that specifies a logical sector offset to use for any access to that SATA device. Rather than simply using the logical sector alignment reported by the SATA device as the logical sector offset, the logical sector offset is set to equal the first physical sector in which all of the logical sectors are available to store user data. The logical sector offset is therefore always on a physical sector boundary.

When the logical sector alignment of SATA device 150 is one, an offset of three is specified in metadata 126. No user data will be stored in logical (sectors) 152, 153, 154, and 155. Logical (sector) 156 is the first logical sector available for the storage of user data. Since logical (sector) 156 is aligned on the boundary between physical sectors 115 and 116, accesses of SATA device 150 will be aligned on physical sector boundaries. Note that the offset equals the number of logical sectors in a physical sector for any particular SATA device. In some embodiments of the present invention, the offset is always set to the number of logical sectors, regardless of the logical sector alignment. In other embodiments, the offset is set to zero when all of the logical sectors in the first physical sector are available to store user data and the offset is set to the number of user available logical sectors in the first physical sector for all other logical sector alignments.

Figure 2B:
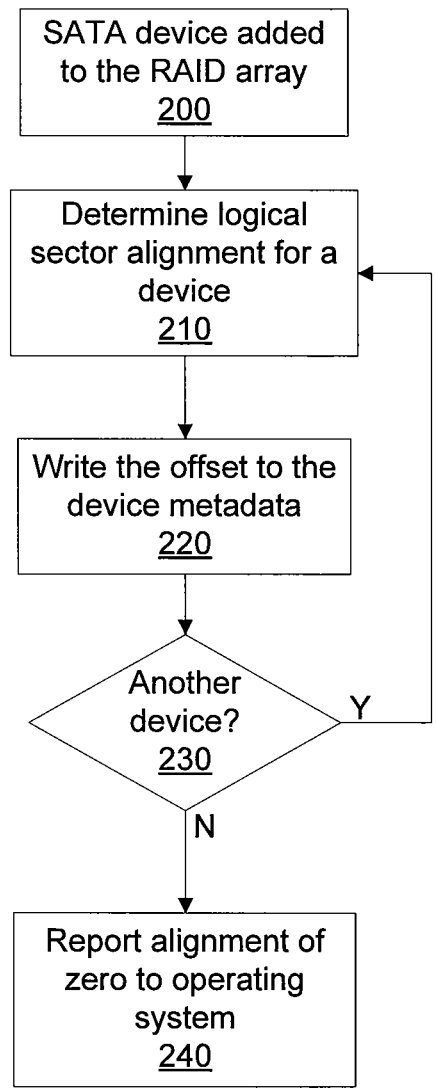
FIG. 2B is an exemplary embodiment of a method of configuring the mass storage devices to support a single logical sector alignment, in accordance with one or more aspects of the present invention.

FIG. 2B is an exemplary embodiment of a method of configuring the mass storage devices to support a single logical sector alignment in accordance with one or more aspects of the present invention. In step 200 one or more SATA devices 150, 160, 170, and 180 are added to RAID array 145. In systems with multiple SATA devices device driver 112 may create RAID array 145. In step 210 device driver 112 determines the logical sector alignment of a first SATA device of SATA devices 150, 160, 170, and 180. In step 220 device driver 112 writes an offset to the metadata of the SATA device. As described in conjunction with FIG. 2A, when the logical sector alignment reported by the SATA device is zero the offset may equal zero, otherwise the offset equals the number of user available logical sectors in the first physical sector. In some embodiments of the present invention, the offset always equals the number of logical sectors and step 210 is omitted.

In step 230 device driver 112 determines if another SATA device is included in RAID array 145, and, if so, steps 210, 220, and 230 are repeated. Otherwise, in step 240, device driver 112 reports a logical alignment value of zero to operating system 105 for the single storage device represented by RAID array 145. When a new SATA device is added to RAID array 145 the method is repeated to configure the metadata stored on the new SATA device. Although the method of configuring a SATA device to use an offset is described in the context of RAID array 145, the method may also be applied to a single SATA device that is not configured in a RAID array.

Physical Sector Size Reporting

Figure 3A:
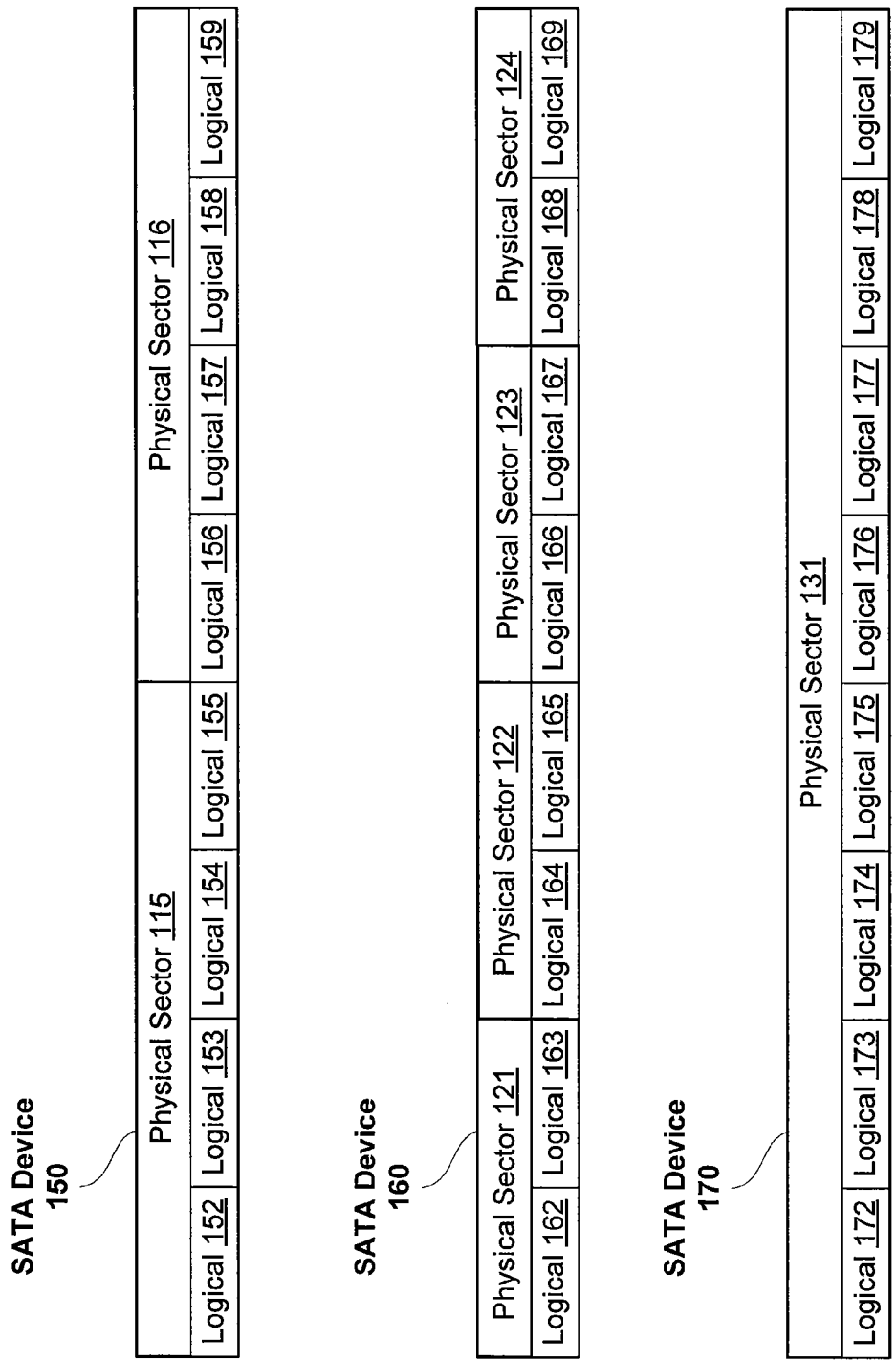
FIG. 3A is a conceptual diagram illustrating mass storage devices having differing physical sector sizes, in accordance with one or more aspects of the present invention.

FIG. 3A is a conceptual diagram illustrating mass storage devices having differing physical sector sizes, e.g., SATA devices 150, 160, 170, and 180, in accordance with one or more aspects of the present invention. SATA device 150 includes multiple physical sectors, of which physical sector 115 and physical sector 116 are shown in FIG. 3A. SATA device 160 also includes multiple physical sectors, of which physical sectors 121, 122, 123, and 124 are shown in FIG. 3A. Finally, SATA device 170 includes multiple physical sectors, one of which is shown in FIG. 3A, physical sector 131. Each physical sector includes a number of logical sectors which are the smallest host addressable unit of data within a SATA device. As shown in FIG. 3A, physical sectors 115 and 116 each include four logical sectors, e.g., logical 152, 153, 154, 155, 156, 157, 158, and 159, physical sectors 121, 122, 123, and 124 each include two logical sectors, e.g., logical 162, 163, 164, 165, 166, 167, 168, and 169, and physical sector 131 includes eight logical sectors, e.g., logical 172, 173, 174, 175, 176, 177, 178, and 179. The physical sector sizes are implemented as "power of two" multiples of the logical sector size.

As previously, explained a single physical device size is used to represent all SATA devices in RAID array 145 since RAID array 145 is presented to operating system 105 as a single storage device. Better storage access performance is achieved when reads and writes to each SATA device 150, 160, 170, and 180 are aligned on a physical sector boundary. When the largest physical sector size of SATA devices 150, 160, 170, and 180 is reported to operating system 105, accesses can be optimized to align on physical sector boundaries for each SATA device 150, 160, 170, and 180, even those devices having smaller physical sector sizes.

Figure 3B:
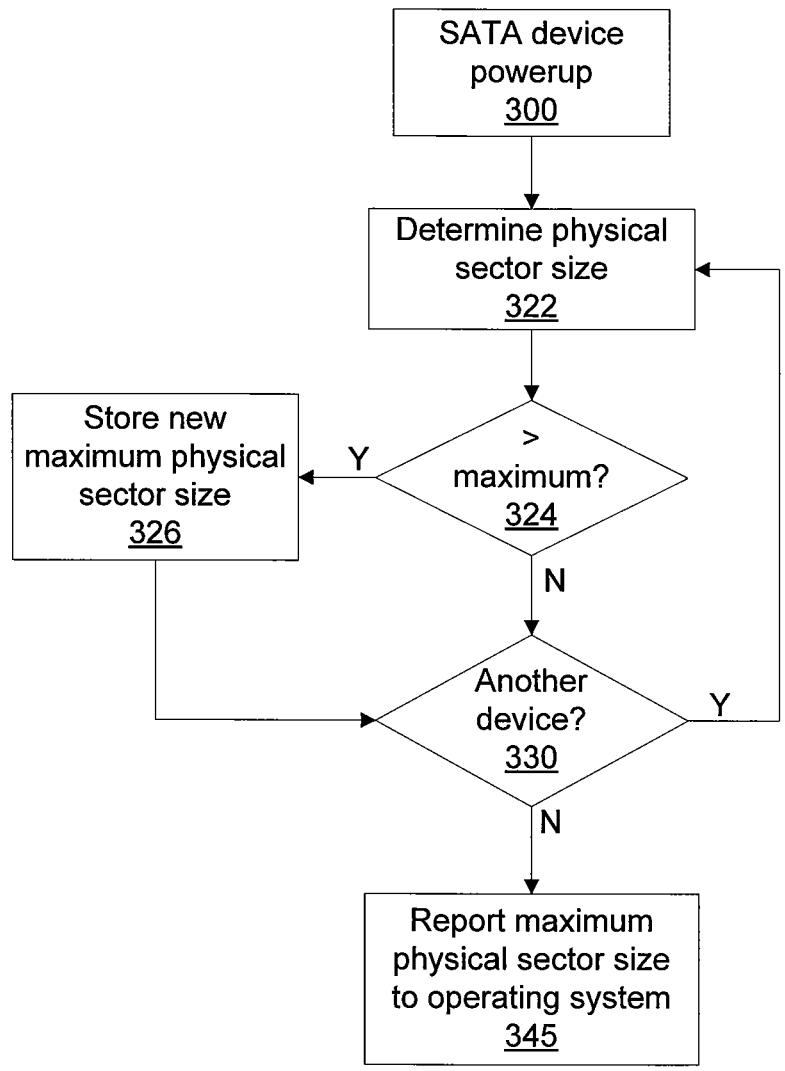
FIG. 3B is an exemplary embodiment of a method of determining a single physical sector size to report to an operating system, in accordance with one or more aspects of the present invention.

FIG. 3B is an exemplary embodiment of a method of determining a single physical sector size to report to operating system 105, in accordance with one or more aspects of the present invention. In step 300 one or more SATA devices 150, 160, 170, and 180 are powered up and device driver 112 creates RAID array 145. Device driver 112 initializes a maximum physical sector size value to zero or some other predetermined minimum value, e.g., the size of a logical sector. In step 322 device driver 112 determines the physical sector size of a first SATA device of SATA devices 150, 160, 170, and 180. In step 324 device driver 112 determines if the physical sector size reported by the first SATA device is greater than the maximum physical sector size value. If the reported physical sector size is greater than the maximum physical sector size value, then in step 326 device driver 112 stores the reported physical sector size as the maximum physical sector size before proceeding to step 330.

In step 330 device driver 112 determines if another SATA device is included in RAID array 145, and, if so, steps 322, 324, and possibly 326 are repeated. Otherwise, in step 345 device driver 112 reports the maximum physical sector size to operating system 105 for the single storage device represented by RAID array 145. When a new SATA device is added to RAID array 145, or an existing SATA device is removed from RAID array 145, the method is repeated, and if the maximum physical sector size changes, the new maximum physical sector size is reported to operating system 105.

Figure 3C:
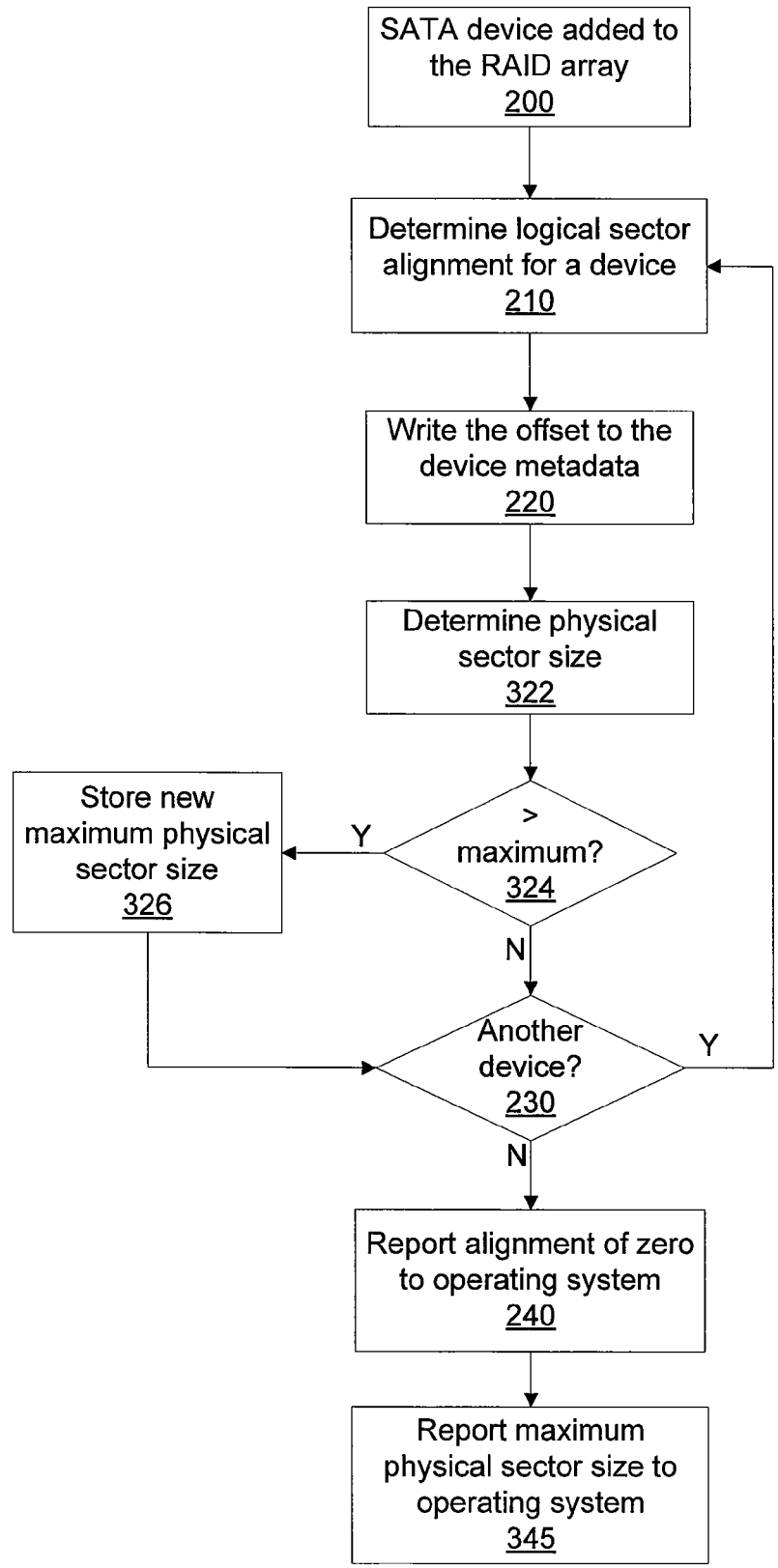
FIG. 3C is an exemplary embodiment of a method of reporting storage characteristics to an operating system, in accordance with one or more aspects of the present invention.

FIG. 3C is an exemplary embodiment of a method of reporting the logical sector alignment and physical sector size storage characteristics to operating system 105, in accordance with one or more aspects of the present invention. FIG. 3C includes steps shown in FIGS. 2B and 3B. Steps 200, 210, and 220 are completed for each SATA device, as previously described in conjunction with FIG. 2B. Device driver 112 then completes steps 322, 324, and optionally 326, for each SATA device, as described in conjunction with FIG. 3B. In step 240, device driver 112 reports a logical alignment value of zero to operating system 105 for the single storage device represented by RAID array 145. In step 345 device driver 112 reports the maximum physical sector size to operating system 105 for the single storage device represented by RAID array 145.

By reporting both the logical sector alignment of zero (after configuring the metadata) and maximum physical sector size, device driver 112 ensures that operating system 105 can optimize accesses to RAID array 145 by avoiding unaligned accesses. The method of determining and reporting the maximum physical sector size allows the use of SATA devices with differing physical sector sizes within a RAID array, so that older and newer SATA devices can all be used. Persons skilled in the art will appreciate that any system configured to perform the method steps of FIG. 2B, 3B, or 3C, or their equivalents, is within the scope of the present invention.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

All trademarks are the respective property of their owners.

The invention claimed is:

1. A method of reporting logical sector alignment for an ATA mass storage device, comprising:
    determining that a first ATA mass storage device has been added to a system configured to be coupled to a plurality of ATA mass storage devices;
    determining a first logical sector alignment for the first ATA mass storage device, wherein the logical sector alignment is based on a quantity of logical sectors in a first physical sector that are available to store user data;
    determining an offset associated with the quantity of logical sectors in the first physical sector that are available to store user data;
    configuring metadata stored in the first ATA mass storage device to store the offset, wherein the offset is applied to all accesses of the first ATA mass storage device;
    reporting a value of zero as the logical sector alignment to an operating system for the first ATA mass storage device;
    determining a maximum physical sector size of a first physical sector size that is reported by the first ATA mass storage device and a second physical sector size that is reported by a second ATA mass storage device, wherein the first ATA mass storage device is configured with the second ATA mass storage device in a redundant array of independent disks (RAID) array that is represented to the operating system as a single mass storage device, and wherein the first physical sector size is different than the second physical sector size; and
    reporting the maximum physical sector size value to the operating system for the single mass storage device that is represented by the RAID array.

2. The method of claim 1, wherein the first logical sector alignment reported by the first ATA mass storage device is less than the number of logical sectors in the physical sector of the first ATA mass storage device.

3. The method of claim 1, further comprising the step of determining a second logical alignment that is reported by the second ATA mass storage device.

4. The method of claim 3, further comprising the step of configuring metadata stored in the second ATA mass storage device to use an offset equal to the number of logical sectors in a physical sector of the second ATA mass storage device.

5. The method of claim 3, further comprising the step of configuring metadata stored in the second ATA mass storage device to use an offset of zero when the second logical alignment equals zero.

6. The method of claim 1, further comprising the steps of:
    determining that the second ATA mass storage device has been removed from the single mass storage device that is represented by the RAID array;
    determining that the first physical sector size is less than the maximum physical sector size; and
    reporting the first physical sector size to the operating system for the single mass storage device that is represented by the RAID array.

7. A non-transitory computer readable medium storing instructions for causing a processor to report a logical sector alignment for an ATA mass storage device, by performing the steps of:
    determining that a first ATA mass storage device has been added to a system configured to be coupled to a plurality of ATA mass storage devices;
    determining a first logical sector alignment for the first ATA mass storage device, wherein the logical sector alignment is based on a quantity of logical sectors in a first physical sector that are available to store user data;
    determining an offset associated with the quantity of logical sectors in the first physical sector that are available to store user data;
    configuring metadata stored in the first ATA mass storage device to use the offset, wherein the offset is applied to all accesses of the first ATA mass storage device; and
    reporting a value of zero as the logical sector alignment to an operating system for the first ATA mass storage device;
    determining a maximum physical sector size of a first physical sector size that is reported by the first ATA mass storage device and a second physical sector size that is reported by a second ATA mass storage device, wherein the first ATA mass storage device is configured with the second ATA mass storage device in a redundant array of independent disks (RAID) array that is represented to the operating system as a single mass storage device, and wherein the first physical sector size is different than the second physical sector size; and
    reporting the maximum physical sector size value to the operating system for the single mass storage device that is represented by the RAID array.

8. The computer readable medium of claim 7, wherein the first logical sector alignment reported by the first ATA mass storage device is less than the number of logical sectors in the physical sector of the first ATA mass storage device.

9. The computer readable medium of claim 7, further comprising the step of determining a second logical alignment that is reported by the second ATA mass storage device.

10. The computer readable medium of claim 9, further comprising the step of configuring metadata stored in the second ATA mass storage device to use an offset equal to the number of logical sectors in a physical sector of the second ATA mass storage device.

11. A system for reporting a logical sector alignment, the system comprising:
    a first ATA mass storage device configured to store data;
    a second ATA mass storage device that is configured with the first ATA mass storage device to create in a redundant array of independent disks (RAID) array that is represented to the operating system as a single mass storage device;
    a central processing unit configured to execute an operating system; and a device driver configured to:
  determine that a first ATA mass storage device has been added to a system configured to be coupled to a plurality of ATA mass storage devices;
  determine a first logical sector alignment for the first ATA mass storage device, wherein the logical sector alignment is based on a quantity of logical sectors in a first physical sector that are available to store user data;
  determine an offset associated with the quantity of logical sectors in the first physical sector that are available to store user data;
  configure metadata stored in the first ATA mass storage device to use the offset, wherein the offset is applied to all accesses of the first ATA mass storage device;
  report a value of zero as the logical sector alignment to the operating system for the first ATA mass storage device;
  determine a maximum physical sector size of a first physical sector size that is reported by the first ATA mass storage device and a second physical sector size that is reported by the second ATA mass storage device, wherein the first physical sector size is different than the second physical sector size; and
  report the maximum physical sector size value to the operating system for the single mass storage device that is represented by the RAID array.

12. The system of claim 11, wherein the device driver is further configured to:
  determine that the second ATA mass storage device has been removed from the single mass storage device that is represented by the RAID array;
  determine that the first physical sector size is less than the maximum physical sector size; and
  report the first physical sector size to the operating system for the single mass storage device that is represented by the RAID array.

13. The system of claim 11, wherein the first logical sector alignment reported by the first ATA mass storage device is less than the number of logical sectors in the physical sector of the first ATA mass storage device.

14. A method of reporting logical sector alignment for an ATA mass storage device, comprising:
  determining that a first ATA mass storage device has been added to a system configured to be coupled to a plurality of ATA mass storage devices;
  determining a first logical sector alignment for the first ATA mass storage device, wherein the logical sector alignment is based on a quantity of logical sectors in a first physical sector that are available to store user data;
  determining an offset associated with the quantity of logical sectors in the first physical sector that are available to store user data;
  configuring metadata stored in the first ATA mass storage device to store the offset, wherein the offset is applied to all accesses of the first ATA mass storage device;
  reporting a value of zero as the logical sector alignment to an operating system for the first ATA mass storage device;
  determining a maximum physical sector size of a first physical sector size that is reported by the first ATA mass storage device and a second physical sector size that is reported by a second ATA mass storage device, wherein the first ATA mass storage device is configured with the second ATA mass storage device in a redundant array of independent disks (RAID) array that is represented to the operating system as a single mass storage device;
  reporting the maximum physical sector size value to the operating system for the single mass storage device that is represented by the RAID array;
  determining that the second ATA mass storage device has been removed from the single mass storage device that is represented by the RAID array;
  determining that the first physical sector size is less than the maximum physical sector size; and
  reporting the first physical sector size to the operating system for the single mass storage device that is represented by the RAID array.

* * * * *